United States Patent
Long (10) Patent No.: US 9,436,500 B2
(45) Date of Patent: *Sep. 6, 2016

(54) MULTI-PROCESSOR COMMAND MANAGEMENT IN ELECTRONIC COMPONENTS WITH MULTIPLE MICROCONTROLLERS

(71) Applicant: International Business Machines Corporation, Armonk, NY (US)

(72) Inventor: Thomas C. Long, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/844,046

(22) Filed: Sep. 3, 2015

(65) Prior Publication Data

US 2016/0085553 A1 Mar. 24, 2016

Related U.S. Application Data

(63) Continuation of application No. 14/494,645, filed on Sep. 24, 2014.

(51) Int. Cl.
*G06F 9/22* (2006.01)
*G06F 9/46* (2006.01)

(52) U.S. Cl.
CPC ...................................... *G06F 9/46* (2013.01)

(58) Field of Classification Search
CPC .......................................................... G06F 9/24
See application file for complete search history.

(56) References Cited

U.S. PATENT DOCUMENTS

2007/0043901 A1\* 2/2007 Wu .................... G11B 19/02
711/111
2016/0085552 A1 3/2016 Long

OTHER PUBLICATIONS

List of IBM Patents or Patent Applications Treated as Related; (Appendix P), Filed Apr. 26, 2016; 2 pages.

\* cited by examiner

*Primary Examiner* — Cheng-Yuan Tseng
(74) *Attorney, Agent, or Firm* — Cantor Colburn LLP; Margaret McNamara (57) ABSTRACT

In one embodiment, a computer-implemented method includes executing firmware including a command list configured to maintain commands executable by a host processor of a field-programmable unit. One or more of the commands define communications between the host processor and one or more back-end processors of the field-replaceable unit. The command list includes both periodic commands representing periodic processes and non-periodic commands representing non-periodic processes. Each command in the command list is set to one of active mode and inactive mode. Executing the firmware includes cycling through the command list, and executing, by the host processor, only the commands in the command list that are set to active mode while cycling through the command list.

6 Claims, 4 Drawing Sheets

MULTI-PROCESSOR COMMAND MANAGEMENT IN ELECTRONIC COMPONENTS WITH MULTIPLE MICROCONTROLLERS

DOMESTIC PRIORITY

This application is a continuation of U.S. patent application Ser. No. 14/494,645, filed Sep. 24, 2014, the disclosure of which is incorporated by reference herein in its entirety.

BACKGROUND

The present invention relates generally to electronic components containing multiple microcontrollers, and more particularly, to multi-processor command management in those electronic components.

An example of an electronic component with multiple microcontrollers is a field-replaceable unit (FRU), which is a programmable component that can be easily removed from and replaced in a server or other computing device. It is often considered beneficial that a power/thermal FRU use one or more small, inexpensive microcontrollers. When using multiple small microcontrollers in an FRU, the savings on a per-unit basis is substantial as compared with a single complex microcontroller, lowering the overall hardware cost of the FRU.

However, generally a small microcontroller is unable to handle the tasks of the FRU on its own, and thus, multiple small microcontrollers may be used in a single FRU. In that case, the multiple microcontroller used include a front-end microcontroller, referred to herein as a host processor, and one or more back-end microcontrollers, referred to herein as back-end processors (BEPs). General existing strategy is to isolate the BEPs from direct contact with external code that communicates directly with the host processor. Thus, the host processor acts a central component of a robust communication design. The host processor behaves as an interface for commands that are to be performed by the FRU. Each BEP may be responsible for assigned tasks. The host processor communicates with the BEPs, monitoring their status, sending commands, and sending and receiving other communications.

An increase in the use of BEPs has led to various back-end communication issues. One inherent problem is coordinating the various processes needing to communicate with the BEPs. The competing processes fall into two categories: periodic and non-periodic. Periodic processes are those that occur repeatedly and expectedly, and include scheduled processes through which the host processor performs cyclic monitoring of the BEPs. Non-periodic processes are those that are not scheduled; rather, they can occur at any time. These include external commands received through the external code, as well as other non-periodic commands originating in the FRU's firmware.

The host processor manages both the periodic and the non-periodic processes, communicating corresponding commands to the BEPs and receiving responses in return. Non-periodic processes are generally given higher priority than periodic processes. Thus, using existing prioritization schemes, if numerous non-periodic processes are received, or if non-periodic processes are received frequently, the periodic processes may become starved out. In other words, the host processor may become saturated with handling the high-priority, non-periodic processes, such that it ignores the periodic ones, which are also essential to the overall operation of the FRU.

SUMMARY

In one embodiment of this disclosure, a system includes firmware of a field-replaceable unit, a host processor of a field-replaceable unit, and one or more back-end processors of a field-replaceable unit. The firmware includes a command list configured to maintain commands. The host processor is configured to execute one or more of the commands in the command list. The one or more back-end processors are in communication with the host processor. One or more of the commands in the command list define communications between the host processor and the one or more back-end processors. The command list includes both periodic commands representing periodic processes and non-periodic commands representing non-periodic processes. Each command in the command list is set to one of active mode and inactive mode. The host processor is further configured to cycle through the command list, and execute only the commands in the command list that are set to active mode while cycling through the command list.

In another embodiment, a computer-implemented method includes executing firmware including a command list configured to maintain commands executable by a host processor of a field-programmable unit. One or more of the commands define communications between the host processor and one or more back-end processors of the field-replaceable unit. The command list includes both periodic commands representing periodic processes and non-periodic commands representing non-periodic processes. Each command in the command list is set to one of active mode and inactive mode. Executing the firmware includes cycling through the command list, and executing, by the host processor, only the commands in the command list that are set to active mode while cycling through the command list.

In yet another embodiment, a computer program product for managing processes of a field-replaceable unit includes a computer readable storage medium having program instructions embodied therewith. The program instructions are executable by a processor to cause the processor to perform a method. The method includes executing firmware including a command list configured to maintain commands executable by a host processor of a field-programmable unit. One or more of the commands define communications between the host processor and one or more back-end processors of the field-replaceable unit. The command list includes both periodic commands representing periodic processes and non-periodic commands representing non-periodic processes. Each command in the command list is set to one of active mode and inactive mode. Executing the firmware includes cycling through the command list, and executing, by the host processor, only the commands in the command list that are set to active mode while cycling through the command list.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of this disclosure are process management systems for FRUs. According to some embodiments, a process management system includes a list of commands executable by the associated FRU. The command list may be established at compile time and may include some or all commands expected to involve the BEPs of the FRUs. The host processor may cycle through the command list, performing only those commands that are currently set as active, and skipping those commands set as inactive. Through the use of a single list of commands, combining both periodic and non-periodic commands, corresponding respectively to periodic and non-periodic processes, the process management system may avoid periodic commands being starved out.

Figure 1:
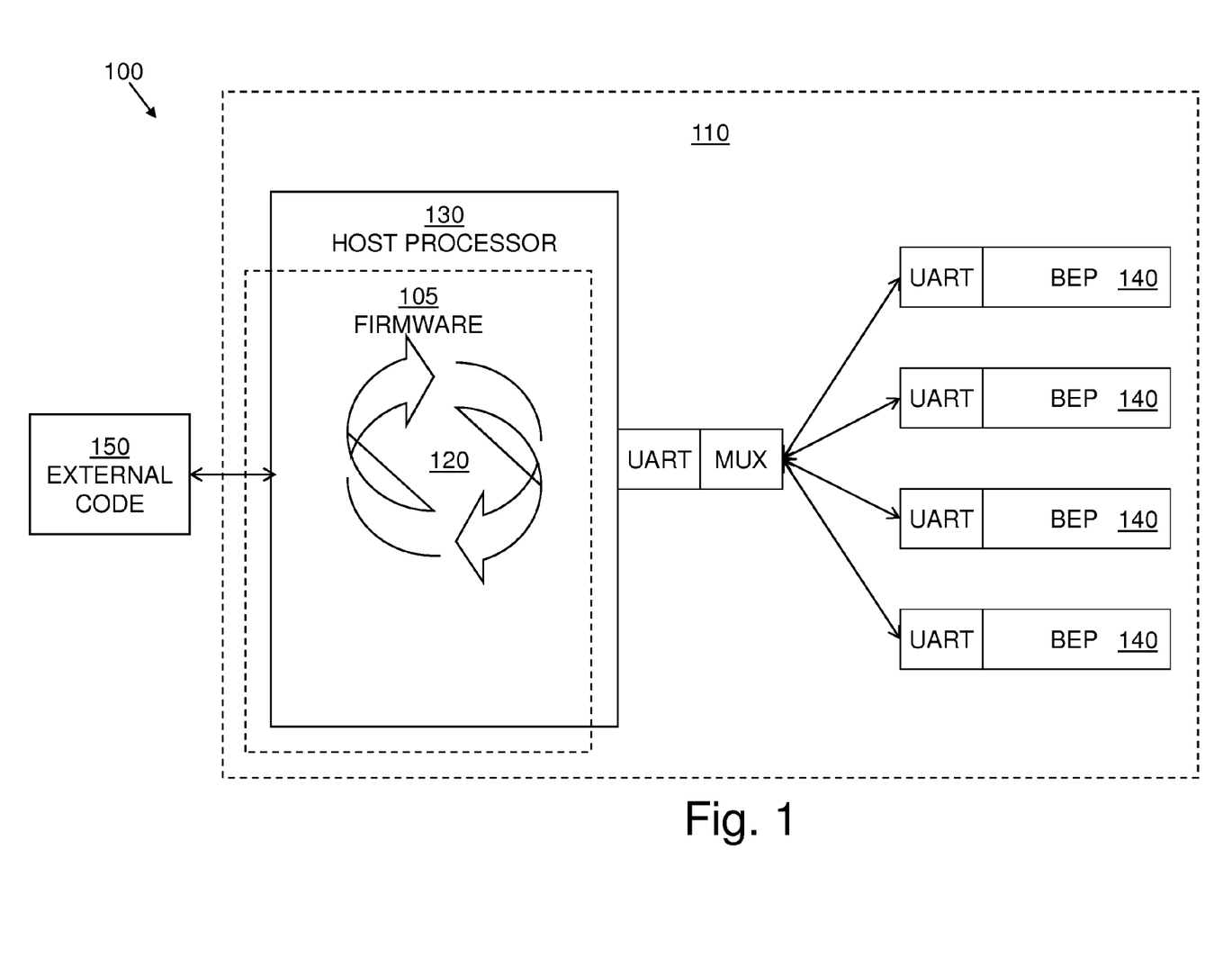
FIG. 1 is a block diagram of a process management system for a field-replaceable unit, according to some embodiments of this disclosure.

FIG. 1 is a block diagram of a process management system 100 for an FRU 110, according to some embodiments of this disclosure. As shown, the process management system 100 may include a single command list 120, including both periodic and non-periodic commands. Each command in the command list 120 may require a host processor 130 to communicate with a BEP 140, of which one or more are included on the FRU 110. The host processor 130 may cycle through the command list 120, executing those of the commands that were previously selected for execution. Each command in the command list 120 may be, at a given time, in either active mode or inactive mode. The host processor 130 may execute a current command of the command list 120 only if the current command is set to active.

In some embodiments, the command list 120 may be part of firmware 105 installed on the FRU 110 and may thus be a fixed list. As a result, memory may be allocated for the command list 120 at compile time of the firmware 105. A benefit of this list being fixed, and not dynamic, is that the host processor 130 need not dynamically allocate and release memory for the command list 120, thus avoiding memory leaks.

As shown in FIG. 1, the host processor 130 may act as an interface with external or internal components, and may accept commands for execution on behalf of all the BEPs 140. Thus, the host processor 130 may be in communication with external code 150, which may provide commands to the host processor 130 from outside the FRU 110. The external code 150 may be a higher layer of code than the FRU firmware 105. The external code 150 may run outside the FRU 110 and may communicate with the FRU 110 to perform command and control functions. While the firmware 105 may run directly on the FRU 110 and manage its hardware functions, the external code 150 may run at a higher layer and manage the FRU firmware 105. The external code 150 may be in communication with the host processor 130 by various mechanisms. For example, and not by way of limitation, the external code 150 may communicate with the host processor 130 through a universal, asynchronous, receiver/transmitter (UART), such as a serial port.

The commands received at the host processor 130 from the external code 150 may already exist in the command list 120, and may currently be set to active or inactive mode. Upon receipt of a command from the external code 150 or elsewhere, a corresponding command in the command list 120 may be activated (i.e., set to active).

As the host processor 130 cycles through the command list 120, the host processor 130 may execute the commands in the command list 120 that are currently active. To execute a command, the host processor 130 may communicate with one or more of the BEPs 140. In some embodiments, the host processor 130 may be communicatively connected to the BEPs 140 by one or more UARTs, such as a serial port, which may be used in combination with one or more multiplexors (MUXs). The multiplexor may switch the communication channel such that communications from the host processor 130 are directed toward the appropriate BEP 140. For example, in some embodiments, as shown in FIG. 1, a single UART may be connected to a MUX, such that the host processor 130 may communicate with all the BEPs 140 through a single connection. After a non-periodic command is performed by the host processor 130, the non-periodic command may then be deactivated (i.e., set to inactive).

Figure 2:
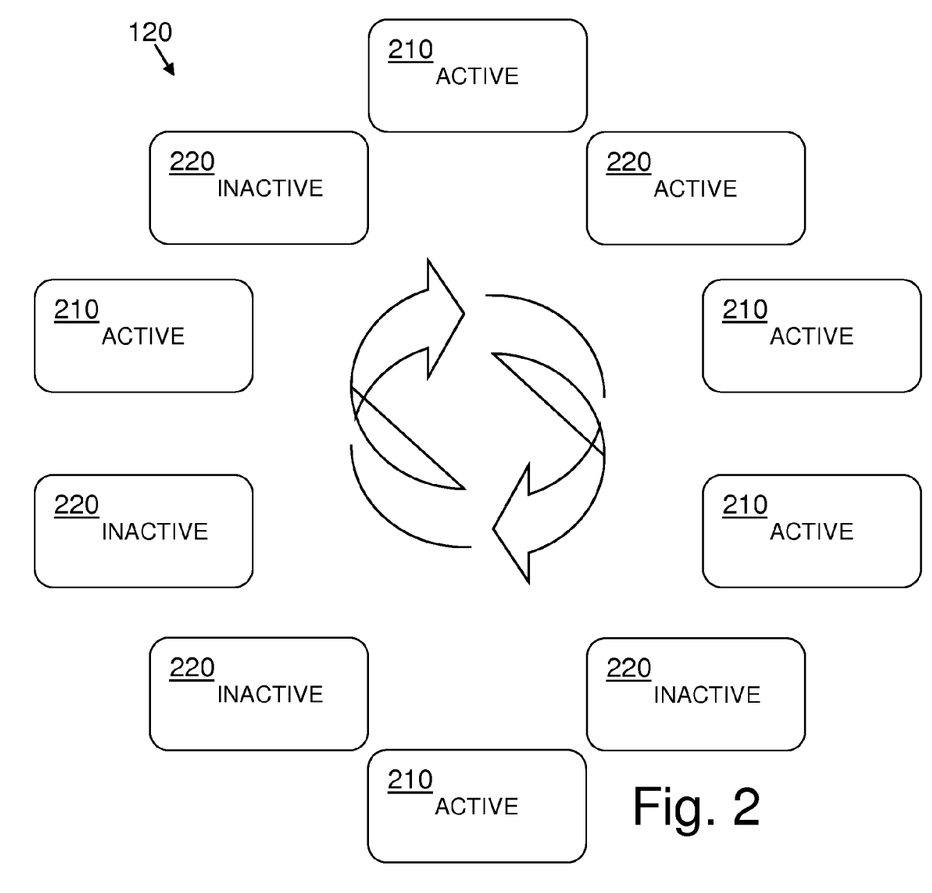
FIG. 2 is a block diagram of a command list used by the process management system, according to some embodiments of this disclosure.

FIG. 2 is a block diagram of a command list 120 used by some embodiments of the process management system 100. As shown, the command list 120 may include both periodic 210 and non-periodic 220 commands, which may be interspersed. In some embodiments, the command list may include some or all commands describing communications between the host processor 130 and the BEPs 140. The host processor 130 may address each command in the command list 120, in a round robin fashion, and perform the commands currently active.

As depicted in FIG. 2, at a given time, some commands in the command list 120 may be active, while others may be inactive. In general, periodic commands 210 may be active in the command list 120 by default, and may remain active at all times. Thus, the host processor 130 may execute those periodic commands 210 at every pass through the command list 120, thus performing such periodic commands 210 periodically, as desired. In contrast, non-periodic commands 220 may be inactive by default. The mode of a non-periodic command 220 in the command list 120 may be set to active when execution of that command is requested, such as by the external code 150.

Various mechanisms made be used for changing a command's mode in the command list 120, specifically, for activating (i.e., setting to active) or deactivating (i.e., setting to inactive) a command. For example, and not by way of limitation, the firmware 105 itself may change a command's mode, such as by performing a "Turn On Voltage Level" command when the firmware 105 detects that a BEP 140 has booted and is in standby. For another example, the external code 150 may modify the mode of a command, such as by performing a "Turn On Voltage Level," or similar, command.

In some instances, it may be the case that a command should be given higher priority over one or more other commands in the command list 120. To account for this, the command list 120 may include multiple instances of higher priority commands. By placing a particular command in the command list 120 multiple times, that command may, in the average case, be reached sooner by the host processor 130 than if the command appeared in the command list 120 only a single time. To activate such a high priority command, the process management system 100 may set to active multiple instances of the command in the command list 120. Thus, it may be the case that a first command given higher priority than a second command may appear a greater number of times in the command list 120 than the second command. Alternatively, such first command may have more active instances than the second command at a time when the first command is given higher priority.

In conventional systems, non-periodic commands are generally given higher priority than periodic commands, since they are issued specifically at times when they are needed. To account for this increased priority, in some embodiments of the present process management system 100, some or all non-periodic commands 220 may be duplicated, such that two or more of each such non-periodic command appear in the command list 120. In contrast, some embodiments may include each periodic command 210 only a single time in the command list 120. In this way, non-periodic commands 220 may be given higher priority than periodic commands 210.

It may be the case that, during runtime of the firmware 105 embodying aspects of the process management system 100, a user or component desires to provide a command to the host processor 130 that is not included in the command list 120. To handle such a situation, the command list 120 may include one or more wildcard commands. Each wildcard command may have a fixed place in the command list 120, as is the case for other commands. A wildcard command may be associated with one or more variables configured to represent a command entered by a user or otherwise received from the external code 150. When such a command is received, the process management system 100 may associate the received command with a wildcard command in the command list 120. The received command may thus be executed when the host processor 130 reaches that wildcard command in the command list 120. In this manner, the host processor 130 need not be limited to only the specific commands included in the command list 120 during compile time.

Figure 3:
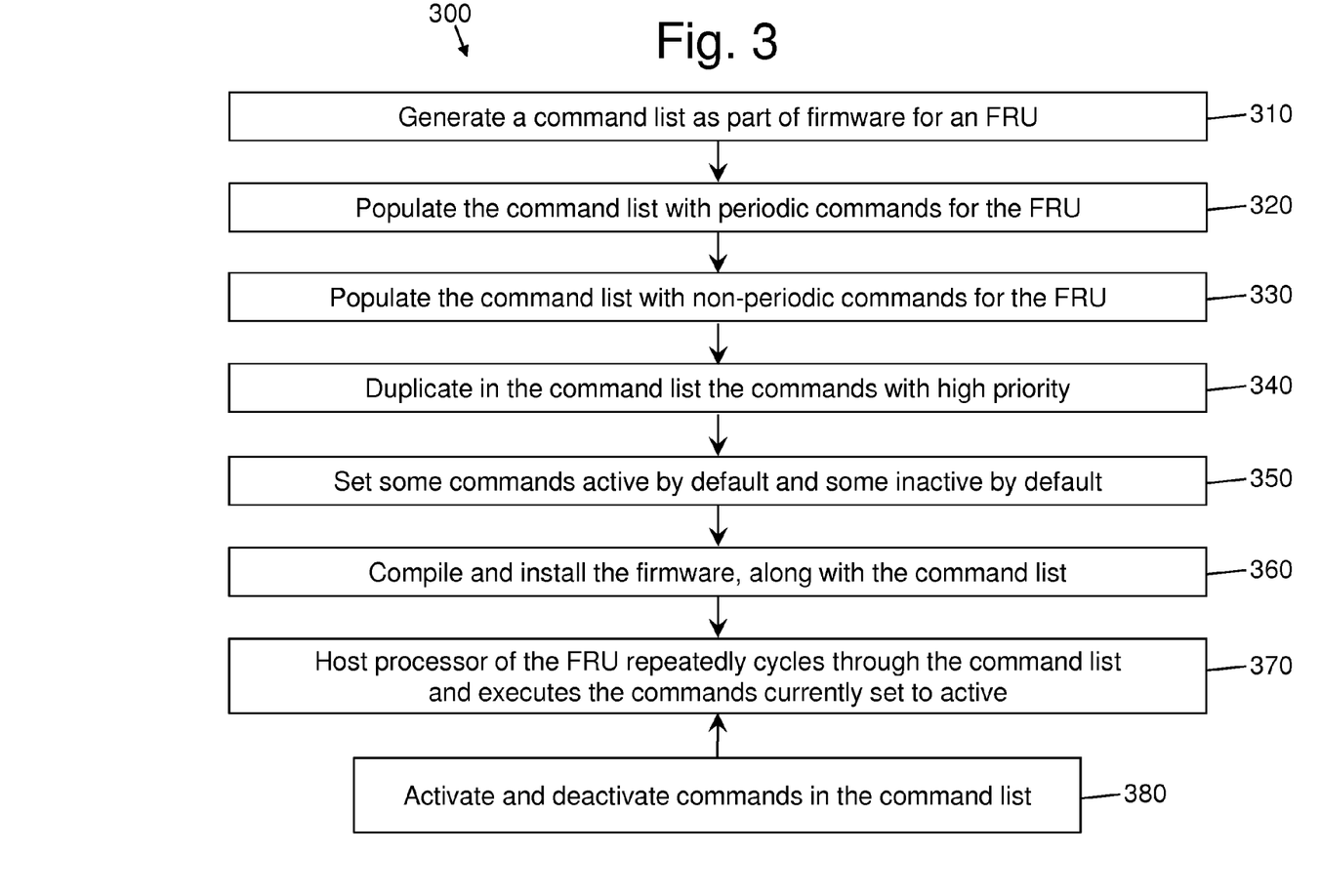
FIG. 3 is a block diagram of a method for managing processes in a field-replaceable unit, according to some embodiments of this disclosure.

FIG. 3 is a block diagram of a method 300 for managing processes in an FRU 110, according to some embodiments of this disclosure. As shown, at block 310, a command list 120 may be generated as part of firmware 105, for maintaining commands receivable by an FRU 110. At block 320, the command list 120 may be populated with periodic commands 210 for the FRU 110. At block 330, the command list 120 may be populated with non-periodic commands 220, which may be interspersed with the periodic commands 210. At block 340, one or more of the commands may be duplicated in the command list 120 to grant those commands higher priority. At block 350, a first subset of the commands in the command list 120 may be set to active by default, while a second subset may be set to inactive by default. At block 360, the firmware 105, along with its command list 120, may be compiled and installed on the FRU 110. At block 370, a host processor 130 of the FRU 110 may cycle through the command list 120, executing only those commands set to active. The activities of block 370 may be performed repeatedly while the firmware is executing. Meanwhile, at block 380, the modes of one or more commands in the command list 120 may occasionally change from active to inactive, or from inactive to active. The host processor 130 may continue to execute the active commands at block 370.

Figure 4:
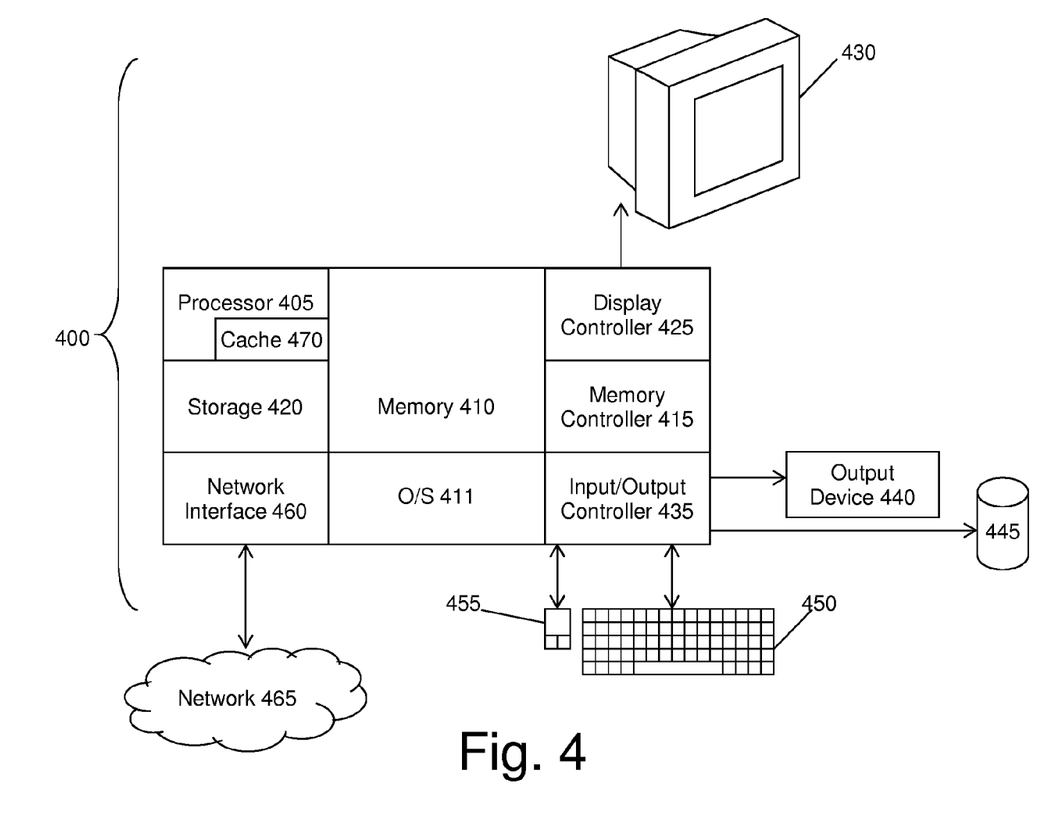
FIG. 4 is a block diagram of a computing device for implementing some or all aspects of the process management system, according to some embodiments of this disclosure.

FIG. 4 illustrates a block diagram of a computer system 400 for use in implementing a process management system or method according to some embodiments. The process management systems and methods described herein may be implemented in hardware, software (e.g., firmware), or a combination thereof. In an exemplary embodiment, the methods described may be implemented, at least in part, in hardware and may be part of the microprocessor of a special or general-purpose computer system 400, such as a personal computer, workstation, minicomputer, or mainframe computer. For instance, in some embodiments, a field-replaceable unit 100 configured to use the process management system 110 may be installed or installable in a computer system 400 such as that shown in FIG. 4. Further, the field-replaceable unit itself may include some aspects of the depicted computer system 400.

In an exemplary embodiment, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. A conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be any custom made or commercially available processor, a central processing unit (CPU), an auxiliary processor among several processors associated with the computer system 400, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the process management systems and methods of this disclosure.

The computer system 400 may further include a display controller 425 coupled to a display 430. In an exemplary embodiment, the computer system 400 may further include a network interface 460 for coupling to a network 465. The network 465 may be an IP-based network for communication between the computer system 400 and any external server, client and the like via a broadband connection. The network 465 transmits and receives data between the computer system 400 and external systems. In an exemplary embodiment, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Process management systems and methods according to this disclosure may be embodied, in whole or in part, in computer program products or in computer systems 400, such as that illustrated in FIG. 4.

Technical effects and benefits of a process management system 100 according to this disclosure include the avoidance of some issues in conventional process management systems for FRUs 110. More specifically, for example, an embodiment of the present process management system 100 may avoid starving out periodic or low-priority commands by maintaining only a single command list 120. In some embodiments, because the host processor 130 may cycle through the entire list, even relatively low priority commands are addressed by the host processor 130 without being starved out.

As compared to conventional FRU process management systems, embodiments of the present process management system 100 may have the following further benefits: fully asynchronous, interrupt-driven communication that allows the firmware 105 to run freely while communication is taking place; ability to manage a set of commands sent on a predetermined, periodic schedule in the form of routine cyclic communication; ability to manage a set of commands sent on an unpredictable schedule, such as in response to changing events or in response to external sources, where those commands are given the same priority as the routine cyclic commands; ability to manage a set of commands sent on an unpredictable schedule, in response to changing events or in response to external sources, where those commands are given higher priority than the routine cyclic commands; ability to support communication between a host processor 130 and one or more BEPs 140, including multiple types of BEPs 140; and ability to handle severe communication bottlenecks during periods of high communication loads, without error; implementation of these functions as a common code library, allowing the use of the functions by any developer in a team environment.

In one embodiment, a system includes firmware of a field-replaceable unit, a host processor of a field-replaceable unit, and one or more back-end processors of a field-replaceable unit. The firmware includes a command list configured to maintain commands. The host processor is configured to execute one or more of the commands in the command list. The one or more back-end processors are in communication with the host processor. One or more of the commands in the command list define communications between the host processor and the one or more back-end processors. The command list includes both periodic commands representing periodic processes and non-periodic commands representing non-periodic processes. Each command in the command list is set to one of active mode and inactive mode. The host processor is further configured to cycle through the command list, and execute only the commands in the command list that are set to active mode while cycling through the command list.

In addition to one or more of the features described above, or as an alternative, the firmware includes no more than a single command list configured to maintain commands for communicating with the back-end processors.

In addition to one or more of the features described above, or as an alternative, the command list is a fixed list for which space is allocated at compile time of the firmware.

In addition to one or more of the features described above, or as an alternative, the periodic commands in the command list remain in active mode, and each non-periodic command in the command list switches to active mode upon receipt, by the firmware, of an instruction to execute the non-periodic command.

In addition to one or more of the features described above, or as an alternative, the command list includes a greater number of instances of a first command than the number of instances of a second command, and the first command is given higher priority than the second command. The host processor is further configured to receive a non-periodic command from outside the field-replaceable unit, where the non-periodic command corresponds to the first command. The firmware is configured to set two or more instances of the first command of the command list to active mode, in response to receiving the non-periodic command, where setting the two or more instances of the first command of the command list to active mode grants the higher priority to the first command.

In addition to one or more of the features described above, or as an alternative, the host processor is further configured to receive a non-periodic command from outside the field-replaceable unit, and the firmware is further configured to set a first command of the command list to active mode, where the first command corresponds to the received non-periodic command, in response to receiving the non-periodic command.

In addition to one or more of the features described above, or as an alternative, the command list includes a wildcard command. The firmware is further configured to receive a command from outside the field-replaceable unit, and determine that the received command corresponds to no command in the command list. The firmware is further configured to associate the received command with a wildcard command in the command list, and activate the wildcard command, in response to receiving the command.

In another embodiment, a computer-implemented method includes executing firmware including a command list configured to maintain commands executable by a host processor of a field-programmable unit. One or more of the commands define communications between the host processor and one or more back-end processors of the field-replaceable unit. The command list includes both periodic commands representing periodic processes and non-periodic commands representing non-periodic processes. Each command in the command list is set to one of active mode and inactive mode. Executing the firmware includes cycling through the command list, and executing, by the host processor, only the commands in the command list that are set to active mode while cycling through the command list.

In addition to one or more of the features described above, or as an alternative, the firmware includes no more than a single command list configured to maintain commands for communicating with the back-end processors.

In addition to one or more of the features described above, or as an alternative, the command list is a fixed list for which space is allocated at compile time of the firmware.

In addition to one or more of the features described above, or as an alternative, the command list includes a greater number of instances of a first command than the number of instances of a second command, and the first command is given higher priority than the second command. Executing the firmware further includes receiving a non-periodic command from outside the field-replaceable unit, where the non-periodic command corresponds to the first command. Executing the firmware further includes setting two or more instances of the first command of the command list to active mode, in response to receiving the non-periodic command, where setting the two or more instances of the first command of the command list to active mode grants the higher priority to the first command.

In addition to one or more of the features described above, or as an alternative, executing the firmware further includes receiving a non-periodic command from outside the field-replaceable unit, and setting a first command of the command list to active mode, where the first command corresponds to the received non-periodic command, in response to receiving the non-periodic command.

In addition to one or more of the features described above, or as an alternative, the command list includes a wildcard command. Executing the firmware further includes receiving a command from outside the field-replaceable unit, and determining that the received command corresponds to no command in the command list. Executing the firmware further includes associating e the received command with a wildcard command in the command list, and activating the wildcard command, in response to receiving the command.

In yet another embodiment, a computer program product for managing processes of a field-replaceable unit includes a computer readable storage medium having program instructions embodied therewith. The program instructions are executable by a processor to cause the processor to perform a method. The method includes executing firmware including a command list configured to maintain commands executable by a host processor of a field-programmable unit. One or more of the commands define communications between the host processor and one or more back-end processors of the field-replaceable unit. The command list includes both periodic commands representing periodic processes and non-periodic commands representing non-periodic processes. Each command in the command list is set to one of active mode and inactive mode. Executing the firmware includes cycling through the command list, and executing, by the host processor, only the commands in the command list that are set to active mode while cycling through the command list.

In addition to one or more of the features described above, or as an alternative, the firmware includes no more than a single command list configured to maintain commands for communicating with the back-end processors.

In addition to one or more of the features described above, or as an alternative, the command list is a fixed list for which space is allocated at compile time of the firmware.

In addition to one or more of the features described above, or as an alternative, the periodic commands in the command list remain in active mode, and each non-periodic command in the command list switches to active mode upon receipt, by the firmware, of an instruction to execute the non-periodic command.

In addition to one or more of the features described above, or as an alternative, the command list includes a greater number of instances of a first command than the number of instances of a second command, and the first command is given higher priority than the second command. Executing the firmware further includes receiving a non-periodic command from outside the field-replaceable unit, where the non-periodic command corresponds to the first command. Executing the firmware further includes setting two or more instances of the first command of the command list to active mode, in response to receiving the non-periodic command, where setting the two or more instances of the first command of the command list to active mode grants the higher priority to the first command.

In addition to one or more of the features described above, or as an alternative, executing the firmware further includes receiving a non-periodic command from outside the field-replaceable unit, and setting a first command of the command list to active mode, where the first command corresponds to the received non-periodic command, in response to receiving the non-periodic command.

In addition to one or more of the features described above, or as an alternative, the command list includes a wildcard command. Executing the firmware further includes receiving a command from outside the field-replaceable unit, and determining that the received command corresponds to no command in the command list. Executing the firmware further includes associating e the received command with a wildcard command in the command list, and activating the wildcard command, in response to receiving the command.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   executing firmware comprising a command list configured to maintain commands executable by a host processor of a field-replaceable unit;
   wherein one or more of the commands define communications between the host processor and one or more back-end processors of the field-replaceable unit;
   wherein the command list comprises both periodic commands representing periodic processes and non-periodic commands representing non-periodic processes;
   wherein each command in the command list is set to one of active mode and inactive mode; and
   wherein executing the firmware comprises:
      cycling through the command list; and
      executing, by the host processor, only the commands in the command list that are set to active mode, while cycling through the command list.

2. The method of claim 1, wherein the firmware comprises no more than a single command list configured to maintain commands for communicating with the back-end processors.

3. The method of claim 1, wherein the command list is a fixed list for which space is allocated at compile time of the firmware.

4. The method of claim 1, wherein the command list comprises a greater number of instances of a first command than the number of instances of a second command, wherein the first command is given higher priority than the second command, and wherein executing the firmware further comprises:
   receiving a non-periodic command from outside the field-replaceable unit, wherein the non-periodic command corresponds to the first command; and
   setting two or more instances of the first command of the command list to active mode, in response to receiving the non-periodic command, wherein setting the two or more instances of the first command of the command list to active mode grants the higher priority to the first command.

5. The method of claim 1, wherein executing the firmware further comprises:
   receiving a non-periodic command from outside the field-replaceable unit; and
   setting a first command of the command list to active mode, wherein the first command corresponds to the received non-periodic command, in response to receiving the non-periodic command.

6. The method of claim 1, wherein the command list comprises a wildcard command, and wherein executing the firmware further comprises:
   receiving a command from outside the field-replaceable unit;
   determining that the received command corresponds to no command in the command list;
   associating the received command with a wildcard command in the command list; and
   activating the wildcard command, in response to receiving the command.

* * * * *